United States Patent
Wang et al.

(10) Patent No.: US 9,624,317 B2
(45) Date of Patent: Apr. 18, 2017

(54) AMPHIPHILIC MACROMOLECULAR EMULSIFIER WITH SWITCHABLE SURFACE ACTIVITY AND USE THEREOF IN PREPARATION OF POLYMER LATEX

(71) Applicant: ZHEJIANG UNIVERSITY, Zhejiang (CN)

(72) Inventors: Wenjun Wang, Zhejiang (CN); Qi Zhang, Zhejiang (CN); Guoqiang Yu, Zhejiang (CN); Bogeng Li, Zhejiang (CN); Shiping Zhu, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 14/367,357

(22) PCT Filed: Dec. 21, 2012

(86) PCT No.: PCT/CN2012/087091
§ 371 (c)(1),
(2) Date: Jun. 20, 2014

(87) PCT Pub. No.: WO2013/091565
PCT Pub. Date: Jun. 27, 2013

(65) Prior Publication Data
US 2014/0316049 A1    Oct. 23, 2014

(30) Foreign Application Priority Data
Dec. 21, 2011    (CN) .......................... 2011 1 0432117

(51) Int. Cl.
| | |
|---|---|
| C08F 2/24 | (2006.01) |
| C08F 212/08 | (2006.01) |
| C08F 220/06 | (2006.01) |
| C08F 20/10 | (2006.01) |
| C08L 25/06 | (2006.01) |
| C08F 293/00 | (2006.01) |
| C08F 220/34 | (2006.01) |

(52) U.S. Cl.
CPC .............. *C08F 2/24* (2013.01); *C08F 20/10* (2013.01); *C08F 293/005* (2013.01); *C08L 25/06* (2013.01); *C08F 212/08* (2013.01); *C08F 220/34* (2013.01); *C08F 2438/03* (2013.01)

(58) Field of Classification Search
None
See application file for complete search history.

(56) References Cited

FOREIGN PATENT DOCUMENTS

| CN | 101302296 A | 11/2008 |
|---|---|---|
| CN | 102492106 A | 6/2012 |

OTHER PUBLICATIONS

Alejandro Vega-Rios and Angel Licea-Claverie (J. Mex. Chem. Soc. 2011, 55(1), 21-32).*
Zhu et al. (eXPRESS Polymer Letters, 2(3), 2008, 214-225).*
Perrier et al. Macromolecules 2005, 38, 2033-2036.*
Smith et al. Progress in Polymer Science 2010, 35, 45-93.*
Manguian et al. Macromolecular Rapid Communications 2006, 27, 399-404.*
International Search Report issued in the corresponding International Application No. PCT/CN2012/087091, mailed on Mar. 28, 2013.
Office Action issued in the corresponding CN Application No. 201110432117.3 mailed on Feb. 20, 2013.

* cited by examiner

*Primary Examiner* — Vu A Nguyen
(74) *Attorney, Agent, or Firm* — Miles & Stockbridge P.C.

(57) ABSTRACT

A macromolecular emulsifier with switchable surface activity, and use thereof for preparation of polymer latex is disclosed. By using the macromolecular emulsifier with switchable surface activity as an emulsifier, a reversibly coagulable and re-dispersible polymer latex can be prepared by emulsion polymerization. The polymer latex can achieve the coagulation of latex particles by heating and aerating with nitrogen, air, inert gas and/or adding a small amount of alkali solution; the coagulated latex particles can be restored and re-dispersed into stable latex by aerating with carbon dioxide and/or adding a small amount of acid solution. The coagulation and re-dispersion process is reversible and is easy to control.

24 Claims, No Drawings

AMPHIPHILIC MACROMOLECULAR EMULSIFIER WITH SWITCHABLE SURFACE ACTIVITY AND USE THEREOF IN PREPARATION OF POLYMER LATEX

TECHNICAL FIELD

The present invention relates to an amphiphilic macromolecular emulsifier with switchable surface activity, and use thereof as an emulsifier for preparation of reversibly coagulable and re-dispersible polymer latex by emulsion polymerization.

BACKGROUND

As a type of important polymer product, synthetic latex has ten million tons of annual output, and is widely used in various industrial fields including construction, textile, papermaking, leather, paint and the like. Synthetic latex is a product obtained from polymerization of monomers which is dispersed into an emulsion in water under the action of a surfactant (emulsifier). With the development of theoretical research on emulsion polymerization, and the progress of industrial technology in emulsion polymerization, many new methods of emulsion polymerization emerge, and meanwhile the application field of synthetic latex is also broadened. The use of water, which is a non-toxic and cheap solvent, as the medium imparts unique advantages to synthetic latex, but the presence of a large amount of water undoubtedly increases the cost of transportation and storage of the latex, and prolongs the drying time of the latex. Stability is one of focuses in the study of synthetic latex. It is controlled by the surfactant existed on the interface between polymer particles and water. Conventional surfactants take a good stabilizing effect during emulsion polymerization and storage of latex. However, it is very difficult to destroy such stability or to recover it after destruction. Chinese patent CN101550218 discloses a preparation method of re-dispersible latex powder, and concretely discloses that a polymer emulsion is prepared by emulsion polymerization, an anti-caking agent is then added, thereafter, the emulsion is subjected to spray drying to obtain a re-dispersible latex powder; the preparation process can be carried out without the addition of protective colloid, thus obviously improving the water resistance and stability of the latex powder and leading the latex to have the same properties with the original emulsion when being re-dispersed in water. The prepared re-dispersible polymer latex powder has high solid content (approximately 100%), can reduce the difficulties of delivery and storage, can be packed by paper, reduce packing cost, has good storage stability and long storage period and is not deteriorated due to freezing or volatilization of water. Chinese patent CN101445574 discloses a core-shell polymer emulsion for manufacturing re-dispersible latex powder and preparation method thereof, the preparation method comprising the steps of preparing monomer pre-emulsified solution to form the core, preparing monomer pre-emulsified solution to form the shell and preparing core-shell polymer emulsion in sequence. The core-shell polymer emulsion obtained according to the invention has excellent film-forming water resistance and tensile strength, and can be applied to various fields including coating industry, chemical building materials, resource utilization of industrial solid wastes, and the like. Chinese Patent CN1217733 discloses a preparation method of polymer powder re-dispersible in aqueous solution, the polymer powder containing free acid or basic group-bearing copolymers, wherein a buffer agent is added before drying to adjust the pH so as to achieve the re-dispersion of the latex. Chinese Patent CN1325921 discloses a process for preparing a re-dispersible synthetic resin powder which adsorbs polyvinyl alcohol resin on its surface, which powder has excellent re-dispersibility, and can be easily dispersed into water to form emulsion. Chinese patent CN101575399 discloses a preparation method of an acrylic acid re-dispersible latex powder, which comprises preparing an acrylic acid re-dispersible latex powder emulsion and spray drying of the acrylic acid re-dispersible latex powder emulsion. The acrylic acid re-dispersible latex powder emulsion is designed in the form of core-shell particles and is obtained by emulsion polymerization of acrylic acid monomer. In the course of spray drying the emulsion, a mineral anti-adhesive agent is added, to thereby obtain the acrylic acid re-dispersible latex powder. The acrylic acid re-dispersible latex powder can be added in concrete and mortar to improve the compressive strength, rupture strength, wear resistance, toughness, adhesion strength, water-retention capacity and constructability of the concrete and mortar.

Recently, Zhao et al published a research report "General Strategy for Making CO2-Switchable Polymers" in ACS Macro Lett 2012, 1:57-61. They found that, by switching between simple, environmentally friendly trigger conditions—carbon dioxide and nitrogen, it is possible to reversibly regulate the lowest critical solubility temperature (LCST) of poly(dimethylaminoethyl methacrylate) (PDMAEMA): tertiary amino group of PDMAEMA can react with carbon dioxide in water to form bicarbonate which makes it possible to greatly enhance the LCST; after the removal of carbon dioxide by using nitrogen, argon or air, the PDMAEMA can recover to its original state. They prepared reversibly swellable and shrinkable hydrogel based on the stimuli-response of PDMAEMA to carbon dioxide. In addition, Wang et al published a research report "Reversibly Coagulable and Re-dispersible Polystyrene Latex Prepared by Emulsion Polymerization of Styrene Containing Switchable Amidine" in Macromolecules 2011, 44:6539-6545. They prepared reversibly coagulable and re-dispersible polymer latex through soap-free emulsion polymerization by using amidine-containing compounds as comonomers with switchable surface activity. However, the latex thus prepared can't be demulsified through charging nitrogen.

DETAILED DESCRIPTION

Embodiments of present invention, in view of the shortcomings in the prior art, provide an amphiphilic macromolecular emulsifier with switchable surface activity, and use thereof for preparation of reversibly coagulable and re-dispersible polymer latex.

One aspect of the present invention relates to an amphiphilic macromolecular emulsifier with switchable surface activity, which is random copolymer, block copolymer, gradient copolymer or graft copolymer or the like obtained by copolymerizing one or more stimuli-responsive monomers and one or more lipophilic monomers in the presence of an initiator via one or more selected from conventional radical polymerization process, coordination polymerization process, and living radical polymerization process.

The conventional radical polymerization process and coordination polymerization process are known in the art, for example, see Pan Zuren, Polymer Chemistry (Third Edition) [M]. Beijing: Chemical Industry Press, 2002, in which conventional radical polymerization process is introduced in detail on pages 70-113, and coordination polymerization process is introduced in detail on pages 198-214. The above document is incorporated herein by reference.

The living radical polymerization process comprises reversible addition-fragmentation chain transfer (RAFT) polymerization, atom transfer radical polymerization (ATRP), nitroxide free radical "mediated" living polymerization (NMP) and stable free radical polymerization (SFRP) and the like. Among them, NMP, ATRP and RAFT polymerization processes are respectively introduced on pages 104-106 of the document: Pan Zuren, Polymer Chemistry (Third Edition) [M]. Beijing: Chemical Industry Press, 2002, and SFRP polymerization is introduced in the document: Braunecker W A, Matyjaszewski K. Controlled/living radical polymerization: Features, developments, and perspectives [J]. Prog. Polym. Sci., 2007, 32: 93-146. The above documents are incorporated herein by reference.

The amphiphilic macromolecular emulsifier with switchable surface activity of the present invention can be prepared by using any one or a combination of several of the above polymerization processes. For example, a brominated isobutyryl-terminated polyethylene having linear or hyper-branched structure is firstly prepared by coordination polymerization of ethylene in the presence of a palladium catalyst, i.e., a bromo-containing palladium diimine catalyst [(ArN=C(Me)-(Me)C=NAr)Pd(CH$_2$)$_3$C—(O)O(CH$_2$)$_2$OC(O)C (CH$_3$)$_2$Br]$^+$SbF$_6^-$, under different pressure and polymerization time, and then an amphiphilic dendritic block copolymer is prepared by subsequent atom transfer radical polymerization (ATRP) of dimethylaminoethyl methacrylate (DMAEMA) initiated by the brominated isobutyryl group in the polyethylene. The polymerization process is described in detail in the documents: Liu, P. et al. "Arm-First" Synthesis of Core-Cross-Linked Multiarm Star Polyethylenes by Coupling Palladium-Catalyzed Ethylene "Living" Polymerization with Atom-Transfer Radical Polymerization [J]. Macromolecules 2011, 44: 4125-4139, and W. Wang et al, "One-Step Synthesis of hyper-branched Polyethylene Macroinitiator and Its Block Copolymers with Methyl Methacrylate or Styrene via ATRP [J]", J. Polym. Sci., Part A: Polym. Chem. 2010, 48 (14): 3024-3032. Alternatively, the amphiphilic macromolecular emulsifier can also be prepared by coordination polymerization, followed by RAFT or NMP. See, e.g., Zhao Y L et al "The synthesis of modified polyethylene via coordination polymerization followed by ATRP, RAFT, NMRP or ROP [J]", Progress in Polymer Science, 2010, 35:1195-1216. The above documents are incorporated herein by reference.

The stimuli-responsive monomers are capable of interacting with carbon dioxide and/or acid, or with nitrogen, air, inert gas and/or alkali. Examples of the stimuli-responsive monomers comprise, but are not limited to: tertiary amine derivatives of (meth)acrylates, e.g., dimethylaminoethyl (meth)acrylate (commercially available from Aladdin), dimethylaminopropyl (meth)acrylate, dimethylaminobutyl (meth)acrylate, diethylaminoethyl (meth)acrylate (commercially available from Aladdin), diethylaminopropyl (meth)acrylate, diethylaminobutyl (methyl)acrylate, 2-(dimethylamino)propan-2-yl methacrylate, 3-(dimethylamino)-2,2-dimethylpropyl methacrylate, 2-(dimethylamino)-2-methylpropyl methacrylate, 4-(dimethylamino)butyl methacrylate; tertiary amine derivatives of (meth)acrylamides, e.g., dimethylaminomethyl (meth)acrylamide, dimethylaminoethyl (meth)acrylamide, dimethylaminopropyl (meth)acrylamide (commercially available from Aladdin), dimethylaminobutyl (meth)acrylamide, diethylaminomethyl (meth)acrylamide, diethylaminoethyl (meth)acrylamide, diethylaminopropyl (meth)acrylamide, diethylaminobutyl (meth)acrylamide; amidine derivatives of (meth)acrylates, e.g., N,N-dimethylacetamidinoethyl (meth)acrylate, N,N-dimethylacetamidinopropyl (meth)acrylate, N,N-dimethylacetamidinobutyl (meth)acrylate, N,N-dimethylacetamidinohexyl (meth)acrylate, N,N-dimethylacetamidinooctyl (meth)acrylate, N,N-dimethylacetamidinodecyl (meth)acrylate, N,N-dimethylacetamidinododecyl (meth)acrylate, N,N-dimethylacetamidinohexadecyl (meth)acrylate; amidine derivatives of (meth)acrylamides, e.g., (N,N-dimethylacetamidino)ethyl (meth)acrylamide, (N,N-dimethylacetamidino)propyl (meth)acrylamide, (N,N-dimethylacetamidino)butyl (meth)acrylamide, (N,N-dimethylacetamidino)hexyl (meth)acrylamide, (N,N-dimethylacetamidino)octyl (meth)acrylamide, (N,N-dimethylacetamidino)decyl (meth)acrylamide, (N,N-dimethylacetamidino)dodecyl (meth)acrylamide, (N,N-dimethylacetamidino)hexadecyl (meth)acrylamide; guanidine derivatives of (meth)acrylates, e.g., tetramethylguanidinoethyl (meth)acrylate, tetramethylguanidinopropyl (meth)acrylate, tetramethylguanidinobutyl (meth)acrylate, tetramethylguanidinohexyl (meth)acrylate; guanidine derivatives of (meth)acrylamides, e.g., (tetramethylguanidino)ethyl (meth)acrylamide, (tetramethylguanidino)propyl (meth) acrylamide, (tetramethylguanidino)butyl (meth)acrylamide, (tetramethylguanidino)hexyl (meth)acrylamide; tertiary amine derivatives of styrenes, e.g., p-dimethylaminoethyl styrene, p-dimethylaminopropyl styrene, p-dimethylaminobutyl styrene; amidine derivatives of styrenes, e.g., p-(N,N-dimethylacetamidino)ethyl styrene, p-(N,N-dimethylacetamidino)propyl styrene, p-(N,N-dimethylacetamidino)butyl styrene, 2-methyl-1-(4-vinylbenzyl)-1,4,5,6-tetrahydropyrimidine, 1-(4-vinylbenzyl)-1,4,5,6-tetrahydropyrimidine; guanidine derivatives of styrenes, e.g., p-(tetramethylguanidino)ethyl styrene, p-(tetramethylguanidino)propyl styrene, p-(tetramethylguanidino)butyl styrene.

In the present invention, the preferred stimuli-responsive monomers comprise dimethylaminoethyl (meth)acrylate, diethylaminoethyl (meth)acrylate, dimethylaminopropyl (meth)acrylate, dimethylaminobutyl (meth)acrylate, diethylaminopropyl (meth)acrylate, diethylaminobutyl (meth) acrylate, N,N-dimethylacetamidinoethyl (meth)acrylate, N,N-dimethylacetamidinopropyl (meth)acrylate, N,N-dimethylacetamidinobutyl (meth)acrylate, N,N-dimethylacetamidinohexyl (meth)acrylate, (N,N-dimethylacetamidino) ethyl (meth)acrylamide, (N,N-dimethylacetamidino)propyl (meth)acrylamide, (N,N-dimethylacetamidino)butyl (meth) acrylamide, (N,N-dimethylacetamidino)hexyl (meth)acrylamide, 2-methyl-1-(4-vinylbenzyl)-1,4,5,6-tetrahydropyrimidine and 1-(4-vinylbenzyl)-1,4,5,6-tetrahydro pyrimidine.

The tertiary amine derivatives of (meth)acrylates described above can be purchased commercially or prepared by reaction of corresponding hydroxyl-terminated tertiary amine compounds with (meth)acryloyl chloride. See, e.g. Martin P, Stanislav S. Precursors of hydrophilic polymers, The potentiometric behavior of isotactic and atactic poly(2-dimethylaminoethyl methacrylate) in water/ethanol solutions [J]. Makromol. Chem., 1985, 186: 111-121. The above document is incorporated herein by reference.

The tertiary amine derivatives of (meth)acrylamides described above can be prepared by reaction of corresponding amino-terminated tertiary amine compounds with (meth) acryloyl chloride. See, e.g. Wang B et al, Synthesis and properties of pH and temperature sensitive P (NIPAAm-co- DMAEMA) hydrogels [J], Colloids and Surfaces B: Biointerfaces, 2008, 64: 34-41. The above document is herein incorporated by reference.

The amidine derivatives of (meth)acrylates described above can be prepared by reaction of corresponding hydroxyl-terminated acetamidine compounds with (meth) acryloyl chloride. The concrete steps are described as follows: step (1): di-tert-butyl dicarbonate (2.5 g, 11.25 mmol, Aladdin Reagent Co., Ltd.) is dissolved in dichloromethane (10 mL), and slowly dropped to a solution of hexanolamine (1.25 g, 10.75 mmol, Alfa (Tianjin) Chemical Co., Ltd.) in dichloromethane (150 mL); after completion of the dropping, the mixed solution is allowed to react at room temperature for 3 h; step (2): triethylamine (1.75 mL) is added to the mixed reaction mixture obtained in step (1), and methacryloyl chloride (1 mL, Aladdin Reagent Co.) is dropped while maintaining the system at a temperature of 0-5° C.; after completion of the dropping, the mixed solution is allowed to react at room temperature for 3 h; the reaction solution is filtered to remove white precipitate; the mother liquor is washed successively with 1 Mhydrochloric acid, 1M NaOH solution and saturated brine; the organic phase is collected, dried over anhydrous sodium sulfate, filtered and subjected to rotary evaporation till the solution volume is approximately 5 mL; step (3): 5 mL of trifluoroacetic acid (TFA, Aladdin Reagent Co., Ltd.) is added to the product obtained in step (2), followed by reaction at room temperature overnight; after removing the solvent and excess TFA by rotary evaporation, a small amount of water is added to dissolve the product, to which saturated sodium carbonate solution is dropped until no bubbles occur; the reaction solution is extracted with chloroform; the organic layer is collected, and dried (over $Na_2SO_4$) to remove the solvent, thereby obtaining a pale yellow viscous liquid, i.e., hexylamino methacrylate (1.14 g); the total conversion of the above three steps is 57.4%; step (4): hexylamino methacrylate (1.14 g, 6.2 mmol) is dissolved in chloroform (10 mL), to which are added 1 mg of hydroquinone, N,N-dimethyl acetamide dimethyl acetal (0.91 g, 8 mmol, J & K CHEMICAL Ltd.); after reacting for 0.5 h, the solvent is removed, thereby obtaining a yellow viscous liquid, i.e., N,N-dimethylacetamidohexyl methacrylate, with a yield of about 100%. $^1$H-NMR(CDCl$_3$): 6.08, 5.53 (2H, CH$_2$=), 4.13 (2H, OCOCH$_2$), 3.18 (2H, CH$_2$N=), 2.88 (6H, N(CH$_3$)$_2$), 1.93 (3H, N=CCH$_3$), 1.88 (3H, CH$_2$=CCH$_3$), 1.67 (2H, OCH$_2$CH$_2$), 1.52-1.49 (6H, NCH$_2$(CH$_2$)$_3$).

The amidine derivatives of (meth)acrylamides described above can be prepared by reaction of corresponding amino-terminated acetamidine compounds with (meth)acryloyl chloride. The concrete steps are described as follows: step (1): di-tert-butyl dicarbonate (31.3 g, 0.145 mol, Aladdin Reagent Co., Ltd.) is dissolved in dichloromethane (50 mL), and slowly dropped to a solution of hexamethylene diamine (50 g, 0.43 mol, Sinopharm Chemical Reagent Co., Ltd.) in dichloromethane (250 mL); after completion of the dropping, the mixed solution is allowed to react at room temperature overnight; the reaction solution is washed successively with 5% sodium carbonate solution and saturated brine; the organic phase is collected, dried and subjected to rotary evaporation, to which is added 1M hydrochloric acid (100 mL), to generate a large amount of white precipitate; after filtration, the filtrate is adjusted with 1M NaOH solution to a pH of 12, extracted with CH$_2$Cl$_2$, dried over anhydrous sodium sulfate and subjected to rotary evaporation to remove the solvent, thereby giving a white solid product Boc hexamethylene diamine (10.66 g, 92.5%); step (2): Boc hexamethylene diamine (10.6 g, 49 mmol) is dissolved in dichloromethane (150 mL), to which is added anhydrous sodium carbonate (5.3 g, 50 mmol); then, methacryloyl chloride (5 mL, 50 mmol, Aladdin Reagent Co.) is dropped while maintaining the system at a temperature of 0-5° C.; after completion of the dropping, the mixed solution is allowed to react at room temperature for 3 h; the reaction solution is washed successively with 1 Mhydrochloric acid, 1M NaOH solution and saturated brine; the organic phase is collected, dried over anhydrous sodium sulfate, filtered and subjected to rotary evaporation till the solution volume is approximately 10 mL; step (3): 40 mL of trifluoroacetic acid (TFA, Aladdin Reagent Co., Ltd.) is added to the product obtained in step (2), followed by reaction at room temperature overnight; after removing the solvent and excess TFA by rotary evaporation, a small amount of water is added to dissolve the product, to which saturated sodium carbonate solution is dropped until no bubbles occur; the reaction solution is extracted with chloroform; the organic layer is collected, and dried (over $Na_2SO_4$) to remove the solvent thereby obtaining a product, hexamethylene diamine monosubstituted acrylamide (7.89 g, 42.8 mmol); the total conversion of steps (2) and (3) is 87.4%; step (4): the product (1.14 g, 6.2 mmol) obtained in step (3) is dissolved in chloroform (10 mL), to which are added 1 mg of hydroquinone, N,N-dimethyl acetamide dimethyl acetal (0.91 g, 8 mmol, J & K CHEMICAL Ltd.); after reacting for 0.5 h, the solvent is removed to obtain a yellow viscous liquid, i.e., (N,N-dimethylacetamidino)hexyl methacrylamide, with a yield of about 100%. $^1$H-NMR(CDCl$_3$): 5.93 (1H, NHCO), 5.62, 5.26 (2H, CH$_2$=), 3.25 (2H, NHCH$_2$), 3.12 (2H, CH$_2$N=), 2.97, 2.89 (6H, N(CH$_3$)$_2$), 2.04 (3H, N=CCH$_3$), 1.92 (3H, CH$_2$=CCH$_3$), 1.80 (2H, NHCH$_2$CH$_2$), 1.50-1.32 (6H, NCH$_2$(CH$_2$)$_3$).

The guanidine derivatives of (meth)acrylates described above can be prepared by reaction of corresponding hydroxyl-terminated tetramethylguanidine compounds with (meth)acryloyl chloride. See, e.g., Funhoff A M et al, Poly (3-guanidinopropyl methacrylate): A Novel Cationic Polymer for Gene Delivery [J], Bioconjugate Chem., 2004, 15: 1212-1220. The above document is incorporated herein by reference.

The guanidine derivatives of (meth)acrylamides described above can be prepared by reaction of corresponding amino-terminated tetramethylguanidine compounds with (meth)acryloyl chloride. The concrete steps are described as follows: step (1), as reported by Treat N J et al: N-(3-aminopropyl) methacrylamide hydrochloride (5 g, 27.98 mol, Polysciences) is dissolved in 20 mL of deionized water, and adjusted to a pH of 11 with 50 wt % NaOH aqueous solution. The neutralized N-(3-aminopropyl) methacrylamide hydrochloride aqueous solution is washed three times with CH$_2$Cl$_2$ (in an amount of 100 mL each time, collecting the oil phase component). The solution is subjected to vacuum distillation to remove CH$_2$Cl$_2$, to give a clear yellow oily liquid; step (2): 4.0 g (27.9 mol) of the product obtained in step (1) is dropwise dropped to a 100 mL round bottom flask containing 2-ethyl-2-isothioureahydrobromide (4.56 g, 24.6 mmol, Aldrich), triethylamine (2.49 g, 24.6 mmol), and acetonitrile (20 mL), and 1 mL of deionized water is added to dissolve, followed by reacting with stirring at room temperature for 16 h. After completion of the reaction, the solvent is removed in vacuum, and the product is further purified by column chromatography with 50:50 ethanol/ethyl acetate as mobile phase, and silica as filler (40-60 mesh) to give 3.3 g of a clear oily 3-guanidinopropyl methacrylamide, yield 72%. $^1$H NMR (D$_2$O): δ(ppm) 1.68 (m, 2H), 1.77 (s, 3H), 3.07 (t, 2H), 3.18 (t, 2H), 5.29 (s, 1H), 5.54 (s, 1H). $^{13}$CnmR (D$_2$O): δ(ppm) 17.6 (CH$_3$), 27.5 (CH$_2$), 36.5 (CH$_2$—N), 38.6 (CH$_2$—N), 121.0 (C), 138.9 (CH$_2$=C), 156.6 (C), 171.8 (C=O).

As to the synthesis of the tertiary amine derivatives of styrenes described above, see, e.g., "Dimethylaminoethylstyrene", Miyake, Tetsuya et al, Jpn. Kokai Tokkyo Koho (1979), JP 54141731 A 19791105. The above document is incorporated herein by reference.

As to the synthesis of the amidine derivatives of styrenes described above, see, e.g., Macromolecules 2011, 44, 6539. The above document is incorporated herein by reference.

As to the synthesis of the guanidine derivatives of styrenes described above, see, e.g., "Synthesis and characterization of polystyrene bearing guanidinium as pendent groups", Yang, Yating et al, Preprints of Symposia—American Chemical Society, Division of Fuel Chemistry (2011), 56(2), 248-249. The above document is incorporated herein by reference.

The lipophilic monomers are known in the art, including, but not limited to: styrene; substituted styrene, e.g., α-methyl styrene; vinyl esters such as vinyl acetate, vinyl propionate, vinyl butyrate, vinyl acrylate, vinyl crotonate, vinyl cyclopentanoate, vinyl cyclohexanoate, cyclohexane-1,2-dicarboxylic acid divinyl ester, cyclohexane-1,3-dicarboxylic acid divinyl ester, cyclohexane-1,4-dicarboxylic acid divinyl ester, butane-1,2,3,4-tetracarboxylic acid tetravinyl ester (see, Method for Preparing Carboxylic Acid Vinyl Esters, CN200680043718.2, 2006); (meth)acrylates, e.g., (meth)acrylic acid C1-C18 esters, preferably (meth)acrylic acid C1-8 alkyl esters, more preferably (meth)acrylic acid C1-6 alkyl esters, such as methyl methacrylate, butyl methacrylate, isobutyl methacrylate, methyl acrylate, ethyl acrylate, butyl acrylate, 2-ethylhexyl acrylate, stearyl acrylate; olefins, e.g., C2-C5 olefins such as ethylene, propylene, butylene, butadiene, isoprene; substituted C2-C4 olefins, e.g., vinyl chloride, vinylidene chloride, chloroprene; C1-C6 alkyl vinyl ethers such as methyl vinyl ether, ethyl vinyl ether, cyclohexyl vinyl ether, n-butyl vinyl ether, isobutyl vinyl ether, acrylonitrile.

In the present invention, the preferred lipophilic monomers comprise C2-C5 olefins, especially ethylene; styrene, α-methyl styrene; (meth)acrylic acid C1-C6 alkyl esters, especially methyl methacrylate, butyl methacrylate, isobutyl methacrylate, methyl acrylate, ethyl acrylate, 2-ethylhexyl acrylate, butyl acrylate; vinyl acetate; vinyl chloride; acrylonitrile.

For preparing the amphiphilic macromolecular emulsifier with switchable surface activity, the weight ratio of the stimuli-responsive monomers to the lipophilic monomers is typically from 0.1 to 10, preferably from 0.2 to 5, more preferably from 0.25 to 4.

For preparing the amphiphilic macromolecular emulsifier with switchable surface activity, an initiator is usually used, which can be oil-soluble azo initiators known in the art, for example, azobisisobutyronitrile; oil-soluble peroxide initiators, such as benzoyl peroxide; which can also be chloro- or bromo-terminated initiators commonly used for ATRP, see, e.g. Matyjaszewski, K. et al, "Atom Transfer Radical Polymerization [J] Chem. Rev., 2001, 101 (9), 2921-2990"; which can also be chloro- or bromo-substituted palladium diimine catalyst, see, e.g., Liu, P. et al, "Arm-First" Synthesis of Core-Cross-Linked Multiarm Star Polyethylenes by Coupling Palladium-Catalyzed Ethylene "Living" Polymerization with Atom-Transfer Radical Polymerization [J] Macromolecules 2011, 44: 4125-4139.

For preparing the amphiphilic macromolecular emulsifier with switchable surface activity, a chain transfer agent is usually used, which can be dodecyl mercaptan, trichloroethylene, t-butyl mercaptan, mercaptoethanol, isooctyl 3-mercaptopropionate known in the art; which can also be dithio or trithio chain transfer agent compounds commonly used for RAFT polymerization, see Pugongwei, Influence of Asymmetry of Chain Structure of Block Copolymer on its Behavior of Regulating Phase Structure of Blends, Doctoral Dissertation, Zhejiang University, hangzhou, China, 2011", wherein dithio chain transfer agents comprise, for example, dithiophenylacetate-1-phenylethyl, dithiophenylacetate-2-cyanopropy, cyanoisopropyl dithiobenzoate, 4-cyanopentanoic acid dithiobenzoate, 2-cyanoisopropyl dithiobenzoate, 2-(2-carboxyethyl dithiocarbonylthio)propionic acid, 4-cyano-4-(diethylthiocarbamoylthio)valeric acid, 2-methoxyethyl 2-phenyl-2-(pentylthiocarbonylthio) acetate; trithio chain transfer agents comprise, for example, 2-cyanopropan-2-yl dodecyl carbonotrithiate, 3-(benzylmercapto thiocarbonyl thio)propionic acid, 2-(ethylmercapto thiocarbonyl thio)-2-methyl propionic acid, 3-((1-carboxyethylmercapto) thiocarbonyl thio)propionic acid, 2,2'-thiocarbonyl di(thioalkyl) di(2-methylpropionic acid).

For preparing the amphiphilic macromolecular emulsifier with switchable surface activity, a solvent is usually used, including those known in the art, for example, benzene, toluene, anisole, diphenyl ether, ethyl acetate, acetone, butyl ketone, ethanol, dimethylformamide, 1,4-dioxane, chloroform and tetrahydrofuran and the like.

The amphiphilic macromolecular emulsifier with switchable surface activity can be of a random, block, gradient or graft structure, preferably a block or gradient structure. The macromolecular emulsifier can have a number average molecular weight ranging from several hundred to hundred thousands, preferably 200-500,000, more preferably 500-200,000. The molecular weight distribution (PDI) is usually 1.0-8.0, preferably 1.0-3.0, as measured by gel permeation chromatography (GPC).

The amphiphilic macromolecular emulsifier with switchable surface activity has surface activity in the case of treating with carbon dioxide and/or acids, and loses its surface activity in the case of treating with nitrogen, air, inert gas and/or alkali; its activity can be reversibly regulated by treating with carbon dioxide and/or acid as well as nitrogen, air, inert gas and/or alkali.

Another aspect of the present invention relates to a method for preparing the amphiphilic macromolecular emulsifier with switchable surface activity, which comprises two stages: in the first stage, total stimuli-responsive monomers, or total lipophilic monomers, or total stimuli-responsive monomers and partial lipophilic monomers, or total lipophilic monomers and partial stimuli-responsive monomers, or total stimuli-responsive monomers and total lipophilic monomers, and an initiator are added to a reactor with a stirrer containing a solvent from which oxygen has been removed through purging nitrogen, wherein, when conventional radical polymerization process or RAFT polymerization process is used, a chain transfer agent needs to be further added, and the reaction is carried out with stirring at a pressure of 1-100 atm and preferably 1-50 atm, and a temperature of −20-120° C. and preferably −5-110° C. for 1-36 h and preferably 2-24 h; in the second stage, the remaining stimuli-responsive monomers and/or lipophilic monomers from which oxygen has been removed through purging nitrogen are added, wherein, when several polymerization processes are used simultaneously, an initiator and/or a chain transfer agent need to be further added, and the reaction continues at a pressure of 1-100 atm and preferably 1-50 atm, and a temperature of −20-120° C. and preferably −5-110° C. for 1-36 h and preferably 2-24 h, to give the amphiphilic macromolecular emulsifier with switchable surface activity. Wherein, in the whole polymerization system, the ratio of total mass of the stimuli-responsive monomers to total mass of the lipophilic monomers is typically 0.1-10, preferably 0.2-5, more preferably 0.25-4.

Still another aspect of the present invention relates to use of the amphiphilic macromolecular emulsifier with switchable surface activity in the preparation of reversibly coagulable and re-dispersible polymer latex.

Still another aspect of the present invention relates to a method of preparing reversibly coagulable and re-dispersible polymer latex by using the amphiphilic macromolecular emulsifier with switchable surface activity, which comprises the following steps:

(1) preparing a monomer emulsion: dissolving a certain amount of the amphiphilic macromolecular emulsifier with switchable surface activity in water, then adding thereto a certain amount of polymerizable monomers one time or gradually, followed by removing oxygen through purging nitrogen, and pre-emulsifying under fully stirring, to obtain a monomer emulsion; wherein the amount of the amphiphilic macromolecular emulsifier with switchable surface activity is 0.1-5%, preferably 0.2-4% of the total mass of the monomer emulsion, and the amount of the polymerizable monomers is 10-40%, preferably 15-30% of the total mass of the monomer emulsion; and (2) polymerizing the emulsion: adding an initiator to the monomer emulsion obtained in step (1), in an amount of 0.01-5%, preferably 0.05-4% of the total mass of the monomer emulsion, and then carrying out the polymerization at a temperature of 25-90° C., preferably 55-85° C., for 1-20 h, preferably 3-10 h, to obtain the reversibly coagulable and re-dispersible polymer latex under a high conversion.

In one embodiment, the method further comprises: in step (1) dissolving a certain amount of a small molecular emulsifier together with the amphiphilic macromolecular emulsifier with switchable surface activity in water, wherein the mass ratio of the small molecular emulsifier to the amphiphilic macromolecular emulsifier with switchable surface activity is 0.1-10:0.1-10, preferably 0.2-2:0.2-2.

The advantages of the present invention are as follows: the amphiphilic macromolecular emulsifier with switchable surface activity can be used as an emulsifier for preparation of reversibly coagulable and re-dispersible polymer latex by emulsion polymerization. The polymer latex can achieve the coagulation of latex particles by adding a small amount of alkali solution and/or by aerating with nitrogen, air, inert gas till a pH of 9-10; the coagulated latex particles can be re-dispersed into a stable latex by aerating with carbon dioxide and/or adding a small amount of acid solution; the re-dispersed latex can achieve the coagulation of latex particles again by aerating with nitrogen, air, inert gas and/or adding a small amount of alkali solution while heating; and the coagulated latex particles can be re-dispersed into a stable latex again by aerating with carbon dioxide and/or adding a small amount of acid solution; the above coagulation and re-dispersion operation is reversible. Thus, a reversibly coagulable and re-dispersible polymer latex can be conveniently prepared according to the present invention.

The polymerizable monomers used for preparing the polymer latex by polymerization in step (2) of the above-mentioned method comprise, but not limited to: styrene; substituted styrene, e.g., α-methyl styrene; vinyl esters, such as vinyl acetate, vinyl propionate, vinyl butyrate, vinyl acrylate, vinyl crotonate, vinyl cyclopentanoate, vinyl cyclohexanoate, cyclohexane-1,2-dicarboxylic acid divinyl ester, cyclohexane-1,3-dicarboxylic acid divinyl ester, cyclohexane-1,4-dicarboxylic acid divinyl ester, butane-1,2,3,4-tetracarboxylic acid tetravinyl ester; (meth)acrylates, e.g., methyl methacrylate, butyl methacrylate, isobutyl methacrylate, methyl acrylate, ethyl acrylate, butyl acrylate, 2-ethylhexyl acrylate, hydroxyethyl methacrylate, hydroxypropyl methacrylate, hydroxyethyl acrylate, hydroxypropyl acrylate, polyoxyethylene methacrylate, polyoxyethylene acrylate; diolefins, e.g., C4-C5 diolefins such as butadiene, isoprene; C2-C8 olefins such as ethylene, propylene, butene, hexene, octene; substituted C2-C8 olefins, such as vinyl chloride, vinylidene chloride, chloroprene; acrylonitrile; (meth)acrylic acid; maleic anhydride, dimethyl maleic anhydride; C1-C6 alkyl vinyl ethers such as methyl vinyl ether, ethyl vinyl ether, cyclohexyl vinyl ether, n-butyl vinyl ether, isobutyl vinyl ether.

In the present invention, the preferred polymerizable monomers comprise styrene, α-methyl styrene; C1-C6 alkyl (meth)acrylate, especially methyl methacrylate, butyl methacrylate, isobutyl methacrylate, methyl acrylate, ethyl acrylate, 2-ethylhexyl acrylate, butyl acrylate, hydroxyethyl methacrylate, hydroxypropyl methacrylate; vinyl acetate; vinyl chloride; chloroprene; butadiene; isoprene; acrylonitrile; maleic anhydride; (meth)acrylic acid; methyl vinyl ether, ethyl vinyl ether; and polyoxyethylene (meth)acrylate.

The small molecular emulsifier comprises small molecular surfactants with switchable surface activity and conventional surfactants known in the art.

The small molecular surfactants with switchable surface activity comprise, but are not limited to: alkyl amine small molecular surfactants with switchable surface activity, e.g., N,N-dimethyldodecylamine, N,N-dimethylhexadecylamine (commercially available from Sigma-Aldrich); alkyl amidine small molecular surfactants with switchable surface activity, e.g., (N,N-dimethylacetamidino)dodecane, (N,N-dimethylacetamidino)hexadecane, see, e.g., Y. Liu et al, Switchable surfactants [J]. Science 2006, 313: 958-960; alkylguanidine small molecular surfactants with switchable surface activity, e.g., (tetramethylguanidino)dodecane, (tetramethylguanidino)hexadecane, see, e.g., Qin Y et al, Synthesis and performance of alkyl tetramethyl guanidine [J], China Surfactant Detergent & Cosmetics, 2009, 39 (2): 89-92. The above documents are incorporated herein by reference.

The conventional surfactants comprise anionic surfactants, cationic surfactants, nonionic surfactants, amphoteric surfactants and the like known in the art. The anionic surfactants comprise, but not limited to: carboxylates, sulfates, sulfonates, phosphates and the like. The cationic surfactants comprise, but not limited to: alkyl primary amine salts, alkyl secondary amine salts, alkyl quaternary ammonium salts, ether quaternary ammonium salts, amide quaternary ammonium salts, heterocyclic quaternary ammonium salts, alkyl biguanide hydrochlorides. The nonionic surfactants comprise, but not limited to: polyoxyethylene carboxylates, polyol carboxylates, polyoxyethylene polyol carboxylates, polyoxyethylene alkyl ethers, polyoxyethylene alkylaryl ethers and the like. The amphoteric surfactants comprise, but not limited to: carboxylic acids, sulfates, phosphates, sulfonic acids and the like. In the present invention, the preferred conventional surfactants are nonionic surfactants and cationic surfactants of alkyl primary amine salts.

The initiator used in step (2) of the above-mentioned method comprises chemical initiators, photochemical initiators and the like known in the art. The chemical initiators comprise, but not limited to, peroxide initiators, azo initiators, redox initiators and the like; wherein, the peroxide initiators comprise, but not limited to, ammonium persulfate, potassium persulfate and the like; the azo initiators comprise, but not limited to, 4,4'-azobis(4-cyanovaleric acid) (commercially available from Sigma-Aldrich), azodiisobutyl amidine hydrochloride (commercially available from Sigma-Aldrich), azodiisopropyl imidazoline hydrochloride (commercially available from J & K), azodiisopropyl imidazoline (available from J & K) and the like; the redox initiator is a composite system of a peroxide and a reducing agent, wherein the peroxide is known in the art, including, but not limited to, potassium persulfate, ammonium sulfate and the like, the reducing agent is known in the art, including, but not limited to, sodium sulfite, sodium bisulfite, sodium formaldehyde sulfoxylate (J & K) and the like. The photochemical initiators comprise, but not limited to: 2-hydroxy-1-[4-(hydroxy)phenyl]-2-methyl-1-acetone and the like. In the present invention, preferably chemical initiators, especially azo initiators, are used.

The equipment used for carrying out the above-mentioned two methods for preparing the polymer latex is known in the art, including, for example, tank reactors, tubular reactors and the like.

The polymer latex prepared by using the above-mentioned two methods has a weight average molecular weight of typically 1-1000 kD, preferably 5-900 kD, and a molecular weight distribution of typically 1.0-10.0, preferably 1.0-8.0, as measured by gel permeation chromatography (GPC); and has a particle size of typically 20-500 nm, preferably 30-400 nm, as measured by laser light scattering instrument or scanning electron microscope or transmission electron microscope.

In the preparation of the polymer latex, additives as commonly used in the art, including chain transfer agents, such as dodecyl mercaptan; viscosity modifiers, such as methyl cellulose; pH adjusting agents, such as hydrochloric acid, sodium hydroxide, and the like, can be introduced.

The alkali solution described above comprises, but not limited to, sodium hydroxide solution, potassium hydroxide solution, barium hydroxide solution, calcium hydroxide solution, ammonia and sodium carbonate solution and the like.

The acid solution described above comprises, but not limited to, perchloric acid, hydroiodic acid, sulfuric acid, hydrobromic acid, hydrochloric acid, nitric acid, iodic acid, oxalic acid, sulfurous acid, phosphoric acid, pyruvic acid, carbonic acid, nitrous acid, citric acid, hydrofluoric acid, malic acid, gluconic acid, formic acid, acetic acid, propionic acid, butyric acid, valeric acid, caproic acid and the like.

The polymer latex prepared according to the present invention can be widely used in various industrial fields including paper, textiles, paints, adhesives, sealants and the like.

The embodiments s and results of the present invention are further illustrated by using the following specific examples, but it cannot be considered that the present invention is only limited to these examples. In these examples, unless otherwise specified, all the parts and percentages are based on weight.

Example 1

(1) Preparation of an amphiphilic macromolecular emulsifier with switchable surface activity: a block copolymer of dimethylaminoethyl methacrylate hydrochloride and styrene (the degrees of polymerization being respectively 10 and 5) by solution RAFT polymerization: 2-cyanopropan-2-yl dodecyl carbonotrithiate (CPDTTC, 0.691 g, 2 mmol, prepared according to the method as described above) as RAFT chain transfer agent, azodiisobutyronitrile (AIBN, J & K, 32.8 mg, 0.2 mmol) as initiator and dimethylaminoethyl methacrylate (DMAEMA, J & K) monomer (3.144 g, 20 mmol) were dissolved in dioxane (Sinopharm, 5.8 g); after removing oxygen through purging nitrogen for half an hour, reaction was carried out at 70° C. with stirring. After 11 h, DMAEMA was nearly completely converted; at this time, a mixed solution of styrene (Sinopharm, 1.042 g, 10 mmol), AIBN (32.8 mg, 0.2 mmol) and dioxane (4.5 g), from which oxygen had been previously removed through purging nitrogen, was added, and the reaction continued with stirring at 70° C. for 11 h. The reaction product was precipitated twice with n-hexane and dried in vacuum, to give a pale yellow solid. The pale yellow solid was dissolved in 25 mL 1 M hydrochloric acid, and freeze-dried to obtain a copolymer of dimethylaminoethyl methacrylate hydrochloride and styrene (the degrees of polymerization being respectively 10 and 5 as measured by $^1$H NMR, the number average molecular weight being 1280 g/mol and the PDI being 1.17 as measured by GPC), which is just an amphiphilic macromolecular emulsifier with switchable surface activity;

(2) 0.1 parts of the amphiphilic macromolecular emulsifier with switchable surface activity obtained in step (1) and 19 parts of deionized water were added to a 50 mL three-neck flask with mechanical stirring;

(3) 5 parts of styrene monomer was added to the solution obtained in step (2), followed by removing oxygen through charging nitrogen for half an hour, and then pre-emulsifying with fully stirring to obtain a monomer emulsion;

(4) 0.044 parts of azodiisopropylimidazolium hydrochloride (V-50) (Qingdao Runxing Photoelectric Material Co., Ltd.) was dissolved in 1 part of water, and added as a polymerization initiator to the monomer emulsion obtained in step (3);

(5) the reaction was carried out at 70° C. for 4 h, and then stopped to obtain a polymer latex.

The thus obtained polymer latex was adjusted to a pH of 9-10 with a small amount of 0.1 M sodium hydroxide aqueous solution, as observed, latex particles became coagulated; after centrifugation and washing 2-3 times, a slurry was obtained, to which was supplemented a certain amount of water; the slurry was aerated with carbon dioxide along with the application of ultrasound, it can be observed that, the latex particles were re-dispersed to obtain a stable polymer latex. The re-dispersed latex was aerated with nitrogen, argon and/or air (while heating), it can be observed that latex particles became coagulated again; the coagulated latex could be re-dispersed into a stable latex again by aerating with carbon dioxide.

In the polymerization system, the final conversion of styrene monomer was 96.9%. As measured by gel permeation chromatography (GPC), the polymer had a weight average molecular weight of 257 kD, and a molecular weight distribution index of 2.7. As measured by laser light scattering particle size analyzer, the latex particles before coagulation had a Z-average particle size of 72.0 nm, the latex particles of the latex obtained after the first time of demulsification with alkali and then re-dispersion with carbon dioxide had a Z-average particle size of 125.0 nm, and the latex particles of the latexes obtained after two-cycle of demulsification with nitrogen and then re-dispersion with carbon dioxide had a Z-average particle size of 130.5 nm and 131.0 nm, respectively. The results of Example 1 showed that the polymer latex obtained by using the amphiphilic macromolecular emulsifier with switchable surface activity according to the above method had good reversible coagulatability and re-dispersibility.

Example 2

(1) Preparation of an amphiphilic macromolecular emulsifier with switchable surface activity: a block copolymer of dimethylaminoethyl methacrylate hydrochloride and styrene (the degrees of polymerization being respectively 10 and 5) by solution RAFT polymerization: 2-cyanopropan-2-yl dodecyl carbonotrithiate (CPDTTC, 0.691 g, 2 mmol) as RAFT chain transfer agent, azodiisobutyronitrile (AIBN, 32.8 mg, 0.2 mmol) as initiator and dimethylaminoethyl methacrylate (DMAEMA) monomer (3.144 g, 20 mmol) were dissolved in dioxane (5.8 g); after removing oxygen through purging nitrogen for half an hour, reaction was carried out at 70° C. with stirring. After 11 h, DMAEMA was nearly completely converted; at this time, a mixed solution of styrene (1.042 g, 10 mmol), AIBN (32.8 mg, 0.2 mmol) and dioxane (4.5 g), from which oxygen had been previously removed through purging nitrogen, was added, and the reaction continued with stirring at 70° C. for 11 h. The reaction product was precipitated twice with n-hexane and dried in vacuum, to give a pale yellow solid. The pale yellow solid was dissolved in 25 mL 1M hydrochloric acid, and freeze-dried to obtain a copolymer of dimethylaminoethyl methacrylate hydrochloride and styrene (the degrees of polymerization being respectively 10 and 5 as measured by $^1$H NMR, the number average molecular weight being 1280 g/mol and the PDI being 1.17 as measured by GPC), which is just an amphiphilic macromolecular emulsifier with switchable surface activity;

(2) 0.2 parts of the amphiphilic macromolecular emulsifier with switchable surface activity obtained in step (1) and 19 parts of deionized water were added to a 50 mL three-neck flask with mechanical stirring;

(3) 5 parts of styrene monomer was added in the solution obtained in step (2), followed by removing oxygen through charging nitrogen for half an hour, and then pre-emulsifying with fully stirring to obtain a monomer emulsion;

(4) 0.044 parts of azodiisopropylimidazolium hydrochloride (V-50) was dissolved in 1 part of water, and added as a polymerization initiator to the monomer emulsion obtained in step (3);

(4) the reaction was carried out at 70° C. for 4 h, and then stopped to obtain a polymer latex;

(5) the thus obtained polymer latex was adjusted to a pH of 9-10 with a small amount of 0.1 M sodium hydroxide aqueous solution, as observed, latex particles became coagulated; after centrifugation and washing 2-3 times, a slurry was obtained, to which was supplemented a certain amount of water; the slurry was aerated with carbon dioxide along with the application of ultrasound, it can be observed that, the latex particles were re-dispersed to obtain a stable polymer latex. The re-dispersed latex was aerated with nitrogen, argon and/or air (while heating), it can be observed that, latex particles became coagulated again; the coagulated latex could be re-dispersed into a stable latex again by aerating with carbon dioxide.

In the polymerization system, the final conversion of styrene monomer was 97.1%. As measured by gel permeation chromatography (GPC), the polymer had a weight average molecular weight of 168 kD, and a molecular weight distribution index of 2.7. As measured by laser light scattering particle size analyzer, the latex particles before coagulation had a Z-average particle size of 55.1 nm, the latex particles of the latex obtained after the first time of demulsification with alkali and then re-dispersion with carbon dioxide had a Z-average particle size of 126.7 nm, and the latex particles of the latexes obtained after two-cycle of demulsification with nitrogen and then re-dispersion with carbon dioxide had a Z-average particle size of 126.3 nm and 130.1 nm, respectively. The results of Example 2 showed that the polymer latex obtained by using the amphiphilic macromolecular emulsifier with switchable surface activity according to the above method had good reversible coagulatability and re-dispersibility.

Example 3

(1) Preparation of an amphiphilic macromolecular emulsifier with switchable surface activity: a block copolymer of dimethylaminoethyl methacrylate hydrochloride and styrene (the degrees of polymerization being respectively 10 and 5) by solution RAFT polymerization: 2-cyanopropan-2-yl dodecyl carbonotrithiate (CPDTTC, 0.691 g, 2 mmol) as RAFT chain transfer agent, azodiisobutyronitrile (AIBN, 32.8 mg, 0.2 mmol) as initiator and dimethylaminoethyl methacrylate (DMAEMA) monomer (3.144 g, 20 mmol) were dissolved in dioxane (5.8 g); after removing oxygen through purging nitrogen for half an hour, reaction was carried out at 70° C. with stirring. After 11 h, DMAEMA was nearly completely converted; at this time, a mixed solution of styrene (1.042 g, 10 mmol), AIBN (32.8 mg, 0.2 mmol) and dioxane (4.5 g), from which oxygen had been previously removed through purging nitrogen, was added, and the reaction continued with stirring at 70° C. for 11 h. The reaction product was precipitated twice with n-hexane and dried in vacuum, to give a pale yellow solid. The pale yellow solid was dissolved in 25 mL 1M hydrochloric acid, and freeze-dried to obtain a copolymer of dimethylaminoethyl methacrylate hydrochloride and styrene (the degrees of polymerization being respectively 10 and 5 as measured by $^1$H NMR, the number average molecular weight being 1280 g/mol and the PDI being 1.17 as measured by GPC), which is just an amphiphilic macromolecular emulsifier with switchable surface activity;

(2) 0.4 parts of the amphiphilic macromolecular emulsifier with switchable surface activity obtained in step (1) and 19 parts of deionized water were added to a 50 mL three-neck flask with mechanical stirring;

(3) 5 parts of styrene monomer was added to the solution obtained in step (2), followed by removing oxygen through charging nitrogen for half an hour, and then pre-emulsifying with fully stirring to obtain a monomer emulsion;

(4) 0.044 parts of azodiisopropylimidazolium hydrochloride (V-50) was dissolved in 1 part of water, and added as a polymerization initiator in the monomer emulsion obtained in step (3);

(4) the reaction was carried out at 70° C. for 4 h, and then stopped to obtain a polymer latex;

(5) the thus obtained polymer latex was adjusted to a pH of 9-10 with a small amount of 0.1 M sodium hydroxide aqueous solution, as observed, latex particles became coagulated; after centrifugation and washing 2-3 times, a slurry was obtained, to which was supplemented a certain amount of water; the slurry was aerated with carbon dioxide along with the application of ultrasound, it can be observed that, the latex particles were re-dispersed to obtain a stable polymer latex. The re-dispersed latex was aerated with nitrogen, argon and/or air (while heating), it can be observed that, latex particles became coagulated again; the coagulated latex could be re-dispersed into a stable latex again by aerating with carbon dioxide.

In the polymerization system, the final conversion of styrene monomer was 96.1%. As measured by gel permeation chromatography (GPC), the polymer had a weight average molecular weight of 131 kD, and a molecular weight distribution index of 2.7. As measured by laser light scattering particle size analyzer, the latex particles before coagulation had a Z-average particle size of 48.6 nm, the latex particles of the latex obtained after the first time of demulsification with alkali and then re-dispersion with carbon dioxide had a Z-average particle size of 103.9 nm, and the latex particles of the latexes obtained after two-cycle of demulsification with nitrogen and then re-dispersion with carbon dioxide had a Z-average particle size of 132.9 nm and 132.5 nm, respectively. The results of Example 3 showed that the polymer latex obtained by using the amphiphilic macromolecular emulsifier with switchable surface activity according to the above method had good reversible coagulatability and re-dispersibility.

Example 4

(1) Preparation of an amphiphilic macromolecular emulsifier with switchable surface activity: a block copolymer of dimethylaminoethyl methacrylate hydrochloride and styrene (the degrees of polymerization being respectively 10 and 5) by solution RAFT polymerization: 2-cyanopropan-2-yl dodecyl carbonotrithiate (CPDTTC, 0.691 g, 2 mmol) as RAFT chain transfer agent, azodiisobutyronitrile (AIBN, 32.8 mg, 0.2 mmol) as initiator and dimethylaminoethyl methacrylate (DMAEMA) monomer (3.144 g, 20 mmol) were dissolved in dioxane (5.8 g); after removing oxygen through purging nitrogen for half an hour, reaction was carried out at 70° C. with stirring. After 11 h, DMAEMA was nearly completely converted; at this time, a mixed solution of styrene (1.042 g, 10 mmol), AIBN (32.8 mg, 0.2 mmol) and dioxane (4.5 g), from which oxygen had been previously removed through purging nitrogen, was added, and the reaction continued with stirring at 70° C. for 11 h. The reaction product was precipitated twice with n-hexane and dried in vacuum, to give a pale yellow solid. The pale yellow solid was dissolved in 25 mL 1M hydrochloric acid, and freeze-dried to obtain a copolymer of dimethylaminoethyl methacrylate hydrochloride and styrene (the degrees of polymerization being respectively 10 and 5 as measured by $^1$H NMR, the number average molecular weight being 1280 g/mol and the PDI being 1.17 as measured by GPC), which is just an amphiphilic macromolecular emulsifier with switchable surface activity;

(2) 0.2 parts of the amphiphilic macromolecular emulsifier with switchable surface activity obtained in step (1) and 19 parts of deionized water were added to a 50 mL three-neck flask with mechanical stirring;

(2) 3.5 parts of styrene and 1.5 parts of methyl methacrylate were added to the solution obtained in step (2), followed by removing oxygen through purging nitrogen for half an hour, and then pre-emulsifying with fully stirring to obtain a monomer emulsion;

(3) 0.044 parts of azodiisopropylimidazolium hydrochloride (V-50) was dissolved in 1 part of water, and added as a polymerization initiator to the monomer emulsion obtained in step (3);

(4) the reaction was carried out at 70° C. for 4 h, and then stopped to obtain a polymer latex;

(5) the thus obtained polymer latex was adjusted to a pH of 9-10 with a small amount of 0.1 M sodium hydroxide aqueous solution, as observed, latex particles became coagulated; after centrifugation and washing 2-3 times, a slurry was obtained, to which was supplemented a certain amount of water; the slurry was aerated with carbon dioxide along with the application of ultrasound, it can be observed that, the latex particles were re-dispersed to obtain a stable polymer latex. The re-dispersed latex was aerated with nitrogen, argon and/or air (while heating), it can be observed that, latex particles became coagulated again; the coagulated latex could be re-dispersed into a stable latex again by aerating with carbon dioxide.

In the polymerization system, the final conversion of styrene monomer was 97.1%. As measured by gel permeation chromatography (GPC), the polymer had a weight average molecular weight of 192 kD, and a molecular weight distribution index of 2.6. As measured by laser light scattering particle size analyzer, the latex particles before coagulation had a Z-average particle size of 57.1 nm, the latex particles of the latex obtained after the first time of demulsification with alkali and then re-dispersion with carbon dioxide had a Z-average particle size of 85.8 nm, and the latex particles of the latexes obtained after two-cycle of demulsification with nitrogen and then re-dispersion with carbon dioxide had a Z-average particle size of 103.6 nm and 105.4 nm, respectively. The results of Example 4 showed that the polymer latex obtained by using the amphiphilic macromolecular emulsifier with switchable surface activity according to the above method had good reversible coagulatability and re-dispersibility.

Example 5

(1) Preparation of an amphiphilic macromolecular emulsifier with switchable surface activity: a block copolymer of dimethylaminoethyl methacrylate hydrochloride and methyl methacrylate (the degrees of polymerization being respectively 10 and 14) by solution RAFT polymerization: 2-cyanopropan-2-yl dodecyl carbonotrithiate (CPDTTC, 0.691 g, 2 mmol) as RAFT chain transfer agent, azodiisobutyronitrile (AIBN, 32.8 mg, 0.2 mmol) as initiator and dimethylaminoethyl methacrylate (DMAEMA) monomer (3.144 g, 20 mmol) were dissolved in dioxane (5.8 g); after removing oxygen through purging nitrogen for half an hour, reaction was carried out at 70° C. with stirring. After 11 h, DMAEMA was nearly completely converted; at this time, a mixed solution of methyl methacrylate (3.004 g, 30 mmol), AIBN (32.8 mg, 0.2 mmol) and dioxane (4.5 g), from which oxygen had been previously removed through purging nitrogen, was added, and the reaction continued with stirring at 70° C. for 11 h. The reaction product was precipitated twice with n-hexane and dried in vacuum, to give a pale yellow solid. The pale yellow solid was dissolved in 25 mL 1M hydrochloric acid, and freeze-dried to obtain a copolymer of dimethylaminoethyl methacrylate hydrochloride and methyl methacrylate (the degrees of polymerization being respectively 10 and 14 as measured by $^1$H NMR, the number average molecular weight being 2360 g/mol and the PDI being 1.10 as measured by GPC), which is just an amphiphilic macromolecular emulsifier with switchable surface activity;

(2) 0.2 parts of the amphiphilic macromolecular emulsifier with switchable surface activity obtained in step (1) and 19 parts of deionized water were added to a 50 mL three-neck flask with mechanical stirring;

(3) 5 parts of methyl methacrylate was added to the solution obtained in step (2), followed by removing oxygen through purging nitrogen for half an hour, and then pre-emulsifying with fully stirring to obtain a monomer emulsion;

(4) 0.044 parts of azodiisopropylimidazolium hydrochloride (V-50) was dissolved in 1 part of water, and added as a polymerization initiator in the monomer emulsion obtained in step (3)

(4) the reaction was carried out at 70° C. for 4 h, and then stopped to obtain a polymer latex;

(5) the thus obtained polymer latex was adjusted to a pH of 9-10 with a small amount of 0.1 M sodium hydroxide aqueous solution, as observed, latex particles became coagulated; after centrifugation and washing 2-3 times, a slurry was obtained, to which was supplemented a certain amount of water; the slurry was aerated with carbon dioxide along with the application of ultrasound, it can be observed that, the latex particles were re-dispersed to obtain a stable polymer latex. The re-dispersed latex was aerated with nitrogen, argon and/or air (while heating), it can be observed that, latex particles became coagulated again; the coagulated latex could be re-dispersed into a stable latex again by aerating with carbon dioxide.

In the polymerization system, the final conversion of methyl methacrylate monomer was 97.0%. As measured by laser light scattering particle size analyzer, the latex particles before coagulation had a Z-average particle size of 80.4 nm, the latex particles of the latex obtained after the first time of demulsification with alkali and then re-dispersion with carbon dioxidehad a Z-average particle size of 81.4 nm, and the latex particles of the latex obtained after further demulsification with nitrogen and then re-dispersion with carbon dioxide had a Z-average particle size of 79.7 nm. The results of Example 5 showed that the polymer latex obtained by using the amphiphilic macromolecular emulsifier with switchable surface activity according to the above method had good reversible coagulatability and re-dispersibility.

Example 6

(1) Preparation of an amphiphilic macromolecular emulsifier with switchable surface activity: a block copolymer of dimethylaminoethyl methacrylate hydrochloride and methyl methacrylate (the degrees of polymerization being respectively 10 and 14) by solution RAFT polymerization: 2-cyanopropan-2-yl dodecyl carbonotrithiate (CP-DTTC, 0.691 g, 2 mmol) as RAFT chain transfer agent, azodiisobutyronitrile (AIBN, 32.8 mg, 0.2 mmol) as initiator and dimethylaminoethyl methacrylate (DMAEMA) monomer (3.144 g, 20 mmol) were dissolved in dioxane (5.8 g); after removing oxygen through purging nitrogen for half an hour, reaction was carried out at 70° C. with stirring. After 11 h, DMAEMA was nearly completely converted; at this time, a mixed solution of methyl methacrylate (3.004 g, 30 mmol), AIBN (32.8 mg, 0.2 mmol) and dioxane (4.5 g), from which oxygen had been previously removed through purging nitrogen, was added, and the reaction continued with stirring at 70° C. for 11 h. The reaction product was precipitated twice with n-hexane and dried in vacuum, to give a pale yellow solid. The pale yellow solid was dissolved in 25 mL 1M hydrochloric acid, and freeze-dried to obtain a copolymer of dimethylaminoethyl methacrylate hydrochloride and methyl methacrylate (the degrees of polymerization being respectively 10 and 14 as measured by $^1$H NMR, the number average molecular weight being 2360 g/mol and the PDI being 1.10 as measured by GPC), which is just an amphiphilic macromolecular emulsifier with switchable surface activity;

(2) 0.1 parts of the amphiphilic macromolecular emulsifier with switchable surface activity obtained in step (1) and 19 parts of deionized water were added to a 50 mL three-neck flask with mechanical stirring;

(3) 3.5 parts of methyl methacrylate and 1.5 parts of butyl acrylate were added to the solution obtained in step (2), followed by removing oxygen through purging nitrogen for half an hour, and then pre-emulsifying with fully stirring to obtain a monomer emulsion;

(4) 0.044 parts of azodiisopropylimidazolium hydrochloride (V-50) was dissolved in 1 part of water, and added as a polymerization initiator in the monomer emulsion obtained in step (3);

(5) the reaction was carried out at 70° C. for 4 h, and then stopped to obtain a polymer latex;

(6) the thus obtained polymer latex was adjusted to a pH of 9-10 with a small amount of 0.1 M sodium hydroxide aqueous solution, as observed, latex particles became coagulated; after centrifugation and washing 2-3 times, a slurry was obtained, to which was supplemented a certain amount of water; the slurry was aerated with carbon dioxide along with the application of ultrasound, as observed, the latex particles were re-dispersed to obtain a stable polymer latex. The re-dispersed latex was aerated with nitrogen, argon and/or air (while heating), it can be observed that, latex particles became coagulated again; the coagulated latex could be re-dispersed into a stable latex again by aerating with carbon dioxide.

In the polymerization system, the final conversion of methyl methacrylate monomer was 99.7%. As measured by gel permeation chromatography (GPC), the polymer had a weight average molecular weight of 281 kD, and a molecular weight distribution index of 3.0. As measured by laser light scattering particle size analyzer, the latex particles before coagulation had a Z-average particle size of 72.2 nm, the latex particles of the latex obtained after the first time of demulsification with alkali and then re-dispersion with carbon dioxide had a Z-average particle size of 102.6 nm, and the latex particles of the latexes obtained after two-cycle of demulsification with nitrogen and then re-dispersion with carbon dioxide had a Z-average particle size of 111.9 nm and 114.5 nm, respectively. The results of Example 6 showed that the polymer latex obtained by using the amphiphilic macromolecular emulsifier with switchable surface activity according to the above method had good reversible coagulatability and re-dispersibility.

Example 7

(1) Preparation of an amphiphilic macromolecular emulsifier with switchable surface activity: a block copolymer of dimethylaminoethyl methacrylate hydrochloride and methyl methacrylate (the degrees of polymerization being respectively 30 and 45) by solution RAFT polymerization: 2-cyanopropan-2-yl dodecyl carbonotrithiate (CP-DTTC, 0.691 g, 2 mmol) as RAFT chain transfer agent, azodiisobutyronitrile (AIBN, 32.8 mg, 0.2 mmol) as initiator and dimethylaminoethyl methacrylate (DMAEMA) monomer (9.432 g, 60 mmol) were dissolved in dioxane (5.8 g); after removing oxygen through charging with nitrogen for half an hour, reaction was carried out at 70° C. with stirring. After 11 h, DMAEMA was nearly completely converted; at this time, a mixed solution of methyl methacrylate (9.012 g, 90 mmol), AIBN (32.8 mg, 0.2 mmol) and dioxane (4.5 g), from which oxygen had been previously removed through purging nitrogen, was added, and the reaction continued with stirring at 70° C. for 11 h. The reaction product was precipitated twice with n-hexane and dried in vacuum, to give a pale yellow solid. The pale yellow solid was dissolved in 25 mL 1M hydrochloric acid, and freeze-dried to obtain a copolymer of dimethylaminoethyl methacrylate hydrochloride and methyl methacrylate (the degrees of polymerization being respectively 30 and 45 as measured by $^1$H NMR, the number average molecular weight being 7620 g/mol and the PDI being 1.16 as measured by GPC), which is just an amphiphilic macromolecular emulsifier with switchable surface activity;

(2) 0.1 parts of the amphiphilic macromolecular emulsifier with switchable surface activity obtained in step (1) and 19 parts of deionized water were added to a 50 mL three-neck flask with mechanical stirring;

(3) 3.5 parts of methyl methacrylate and 1.5 parts of butyl acrylate were added to the solution obtained in step (2), followed by removing oxygen through purging nitrogen for half an hour, and then pre-emulsifying with fully stirring to obtain a monomer emulsion;

(3) 0.044 parts of azodiisopropylimidazolium hydrochloride (V-50) was dissolved in 1 part of water, and added as a polymerization initiator in the monomer emulsion obtained in step (3);

(4) the reaction was carried out at 70° C. for 4 h, and then stopped to obtain a polymer latex;

(5) the thus obtained polymer latex was adjusted to a pH of 9-10 with a small amount of 0.1 M sodium hydroxide aqueous solution, as observed, latex particles became coagulated; after centrifugation and washing 2-3 times, a slurry was obtained, to which was supplemented a certain amount of water; the slurry was aerated with carbon dioxide along with the application of ultrasound, it can be observed that, the latex particles were re-dispersed to obtain a stable polymer latex. The re-dispersed latex was aerated with nitrogen, argon and/or air (while heating), it can be observed that, latex particles became coagulated again; the coagulated latex could be re-dispersed into a stable latex again by aerating with carbon dioxide.

In the polymerization system, the final conversion of methyl methacrylate monomer was 99.7%. As measured by gel permeation chromatography (GPC), the polymer had a weight average molecular weight of 281 kD, and a molecular weight distribution index of 3.0. As measured by laser light scattering particle size analyzer, the latex particles before coagulation had a Z-average particle size of 72.2 nm, the latex particles of the latex obtained after the first time of demulsification with alkali and then re-dispersion with carbon dioxidehad a Z-average particle size of 102.6 nm, and the latex particles of the latexes obtained after two-cycle of demulsification with nitrogen and then re-dispersion with carbon dioxide had a Z-average particle size of 111.9 nm and 1114.5 nm, respectively. The results of Example 7 showed that the polymer latex obtained by using the amphiphilic macromolecular emulsifier with switchable surface activity according to the above method had good reversible coagulatability and re-dispersibility.

Comparative Example 1

(1) 0.125 parts of dodecylamine hydrochloride (Aldrich) as surfactant, and 19 parts of deionized water were added to a 50 mL three-neck flask with mechanical stirring;

(2) 5 parts of styrene monomer was added to the solution obtained in step (1), followed by removing oxygen through charging nitrogen for half an hour, and then pre-emulsifying with fully stirring to obtain a monomer emulsion;

(3) 0.047 parts of azodiisopropylimidazolium hydrochloride (V-50) was dissolved in 1 part of water, and added as a polymerization initiator to the monomer emulsion obtained in step (2);

(3) the reaction was carried out at 70° C. for 8 h, and then stopped.

In the polymerization system, the final conversion of styrene monomer was 92.8%. As measured by gel permeation chromatography (GPC), the polymer had a weight average molecular weight of 349 kD, and a molecular weight distribution index of 7.4. As measured by laser light scattering particle size analyzer, the latex particles had a Z-average particle size of 74.4 nm. By adding a small amount of 0.1 M sodium hydroxide aqueous solution, the obtained polymer latex could achieve coagulation of latex particles, but the coagulated latex particles could not be re-dispersed to obtain a stable polymer latex by aerating with carbon dioxide along with the application of ultrasound. The results of Comparative Example 1 showed that the polymer latex obtained according to the above method cannot be reversibly coagulated and re-dispersed.

Comparative Example 2

(1) 0.125 parts of dodecylamine hydrochloride as surfactant, and 19 parts of deionized water were added to a 50 mL three-neck flask with mechanical stirring;

(2) 5 parts of styrene monomer was added to the solution obtained in step (1), followed by removing oxygen through charging nitrogen for half an hour, and then pre-emulsifying with fully stirring to obtain a monomer emulsion;

(3) 0.094 parts of azodiisopropylimidazolium hydrochloride (V-50) was dissolved in 1 part of water, and added as a polymerization initiator to the monomer emulsion obtained in step (2);

(4) the reaction was carried out at 70° C. for 8 h, and then stopped.

In the polymerization system, the final conversion of styrene monomer was 96.7%. As measured by gel permeation chromatography (GPC), the polymer had a weight average molecular weight of 184 kD, and a molecular weight distribution index of 7.1. As measured by laser light scattering particle size analyzer, the latex particles had a Z-average particle size of 73.5 nm. By adding a small amount of 0.1 M sodium hydroxide aqueous solution, the obtained polymer latex could achieve coagulation of latex particles, but the coagulated latex particles could not be re-dispersed to obtain a stable polymer latex by aerating with carbon dioxide along with the application of ultrasound. The results of Comparative Example 2 showed that the polymer latex obtained according to the above method cannot be reversibly coagulated and re-dispersed.

Example 8

(1) Reaction was carried out by using a bromine-containing functional palladium catalyst [(ArN=C(Me)-(Me)

C=NAr)Pd(CH$_2$)$_3$C—(O)O(CH$_2$)$_2$OC(O)C(CH$_3$)$_2$Br]$^+$ SbF$_6^-$ in a 2 L autoclave equipped with a circulating water bath jacket, under anhydrous and anaerobic conditions. Before the reaction, the autoclave was washed with toluene and ethanol, and then vacuumized/aerated with nitrogen three times at 70° C. After cooling the autoclave with jacketed cooling water to 5° C. in a nitrogen atmosphere, 400 mL of anhydrous chlorobenzene solvent was injected. After the solvent was cooled to 5° C., 0.32 g (0.4 mmol) of catalyst 1 dissolved in 40 mL of chlorobenzene was injected into the reaction system, and meanwhile ethylene pressure in the reaction system was increased to 27.6 atm (400 psi) to start the reaction. After reacting for 1 h, the system pressure was released to 1 atm. The reaction solution was collected, and poured into a large amount of 2% acidified methanol solution to precipitate the polymer. The resulting polymer was re-dissolved in THF, and the thus formed solution was filtered with a 0.2 μm tetrafluoroethylene syringe-driven filter to remove Pd particles. The resulting filtrate was precipitated with methanol. The dissolution-precipitation process was repeated two to three times until the resulting polymer product became colorless and clear. The product was dried under 60° C. for 3 days, to give 2.67 g of a PE polymer, having a number average molecular weight of 10.4 kg/mol, and a PDI of 1.22, as measured by GPC.

(2) 0.21 g (1 eq) of polyethylene (PE-Br) was placed in a 20 mL Schlenck reaction tube, to which were added 2.0 mL of toluene solvent, 2.05 mL (1.91 g) of the DMAEMA (1200 molar equivalents), and 18.9 μl of ligand HMTETA (6.6 molar equivalents). Then, the reaction tube was sealed with a rubber stopper. After polyethylene was dissolved, the solution was deoxygenated by bubbling with nitrogen for 30 min or by three-cycle of freezing-vacuumizing-aerating with nitrogen. In a N$_2$ atmosphere, 6.0 mg CuCl (6 molar equivalents) and 0.8 mg of CuCl$_2$ (0.6 molar equivalents) were added, and stirred at room temperature for 5 min. Then, the reaction tube was moved into an oil bath pot at 50° C. to start the reaction. After reacting for 6 h, a methanol solution containing hydroquinone polymerization inhibitor was added to the system to stop the reaction. The resulting solution was subjected to spin evaporation to remove the solvent (toluene and methanol), re-dissolved in methanol, dialyzed against deionized water to remove un-reacted monomers and catalyst from the system, and then freeze-dried to obtain 0.59 g of the corresponding block copolymer product. The conversion of DMAEMA was 19.7%, and the obtained block copolymer had a molecular weight of 66.4 kg/mol, and a PDI of 1.34.

From the above Examples and Comparative Examples, it can be seen that the amphiphilic macromolecular emulsifier with switchable surface activity according to the present invention can be used as a surfactant for emulsion polymerization of monomer to prepare a stable polymer latex. The polymer latex can achieve the coagulation of latex particles by adding a small amount of alkali solution and/or by aerating with nitrogen, air, inert gas; the coagulated latex particles can be re-dispersed into a stable latex by aerating with carbon dioxide and/or adding a small amount of acid solution. The coagulation and re-dispersion process is reversible and is easy to control. Thus, a reversibly coagulable and re-dispersible polymer latex can be conveniently prepared according to the present invention.

The above examples are used to explain the present invention, but not to limit the present invention. Any modifications and variations to the present invention in the spirit of the present invention and within the protection scope of the present claims fall within the protection scope of the present invention.

The invention claimed is:

1. An amphiphilic macromolecular emulsifier with switchable surface activity, which is a block copolymer obtained by copolymerizing one or more stimuli-responsive monomers and one or more lipophilic monomers in the presence of an initiator via reversible addition-fragmentation chain transfer (RAFT) polymerization;
   wherein the obtained block copolymer includes a structure composed of a hydrophilic segment-lipophilic segment-terminal RAFT reactive group in the molecule thereof;
   wherein the weight ratio of the stimuli-responsive monomers to the lipophilic monomers is 0.1-10;
   wherein the amphiphilic macromolecular emulsifier with switchable surface activity has a number average molecular weight of 500-200,000; and
   wherein the stimuli-responsive monomers comprise tertiary amine derivatives of (meth)acrylates, tertiary amine derivatives of (meth)acrylamides, amidine derivatives of (meth)acrylates, amidine derivatives of (meth)acrylamides, guanidine derivatives of (meth) acrylates, guanidine derivatives of (meth)acrylamides, tertiary amine derivatives of styrenes, amidine derivatives of styrenes and guanidine derivatives of styrenes.

2. The amphiphilic macromolecular emulsifier with switchable surface activity according to claim 1, wherein the stimuli-responsive monomers comprise dimethylaminoethyl (meth)acrylate, diethylaminoethyl (meth)acrylate, dimethylaminopropyl (meth)acrylate, dimethylaminobutyl (meth)acrylate, diethylaminopropyl (meth)acrylate, diethylaminobutyl (meth)acrylate, N,N-dimethylacetamidinoethyl (meth)acrylate, N,N-dimethylacetamidinopropyl (meth)acrylate, N,N-dimethylacetamidinobutyl (meth)acrylate, N,N-dimethylacetamidinohexyl (meth)acrylate, (N,N-dimethylacetamidino)ethyl (meth)acrylamide, (N,N-dimethylacetamidino)propyl (meth)acrylamide, (N,N-dimethylacetamidino)butyl (meth)acrylamide, (N,N-dimethylacetamidino)hexyl (meth)acrylamide, 2-methyl-1-(4-vinylbenzyl)-1,4,5,6-tetrahydropyrimidine, and 1-(4-vinylbenzyl)-1,4,5,6-tetrahydro pyrimidine.

3. The amphiphilic macromolecular emulsifier with switchable surface activity according to claim 1, wherein the one or more lipophilic monomers comprise styrene, substituted styrene, vinyl esters, (meth)acrylates, C2-C5 olefins, substituted C2-C4 olefins, C1-C6 alkyl vinyl ethers, and acrylonitrile.

4. The amphiphilic macromolecular emulsifier with switchable surface activity according to claim 3, wherein the one or more lipophilic monomers comprise styrene, α-methyl styrene, C2-C5 olefins, (meth)acrylic acid C1-C6 alkyl esters, vinyl acetate, vinyl chloride, and acrylonitrile.

5. The amphiphilic macromolecular emulsifier with switchable surface activity according to claim 1, wherein the initiator comprises oil-soluble azo initiators or oil-soluble peroxide initiators.

6. The amphiphilic macromolecular emulsifier with switchable surface activity according to claim 1, wherein the copolymerizing is carried out in the presence of a chain transfer agent comprising dithio or trithio chain transfer agent compounds.

7. The amphiphilic macromolecular emulsifier with switchable surface activity according to claim 6 wherein the dithio or trithio chain transfer agent compounds comprise dithiophenylacetate-1-phenylethyl, dithiophenylacetate-2- cyanopropyl, cyanoisopropyl dithiobenzoate, 4-cyanopentanoic acid dithiobenzoate, 2-cyanoisopropyl dithiobenzoate, 2-(2-carboxyethyl dithiocarbonylthio)propionic acid, 4-cyano-4-(diethylthiocarbamoylthio)valeric acid, 2-methoxyethyl 2-phenyl-2-(pentylthiocarbonylthio) acetate, 3-(benzylmercapto thiocarbonyl thio)propionic acid, 2-(ethylmercapto thiocarbonyl thio)-2-methyl propionic acid, 3-((1-carboxyethylmercapto) thiocarbonyl thio) propionic acid, 2,2'-thiocarbonyl di(thioalkyl) di(2-methyl-propionic acid) and 2-cyanopropan-2-yl dodecyl carbonotrithiate.

8. A method for preparing an amphiphilic macromolecular emulsifier with switchable surface activity comprised of a block copolymer obtained by copolymerizing one or more stimuli-responsive monomers and one or more lipophilic monomers in the presence of an initiator via reversible addition-fragmentation chain transfer (RAFT) polymerization, wherein the obtained block copolymer includes a structure composed of a hydrophilic segment-lipophilic segment-terminal RAFT reactive group in the molecule thereof, wherein the weight ratio of the stimuli-responsive monomers to the lipophilic monomers is 0.1-10, and wherein the amphiphilic macromolecular emulsifier with switchable surface activity has a number average molecular weight of 200-500,000, the method comprising:

in a first stage, adding total stimuli-responsive monomers, or total lipophilic monomers, or total stimuli-responsive monomers and partial lipophilic monomers, or total lipophilic monomers and partial stimuli-responsive monomers, or total stimuli-responsive monomers and total lipophilic monomers, and a first initiator to a reactor with a stirrer and containing a solvent and from which oxygen has been removed through purging nitrogen; wherein, when conventional radical polymerization process or RAFT polymerization process is used, further adding a first chain transfer agent; and carrying out the reaction under stirring at a pressure of 1-100 atm, and a temperature of −20-120° C. for 1-36 h;

in a second stage, adding the remaining stimuli-responsive monomers and/or lipophilic monomers from which oxygen has been removed through purging nitrogen;

wherein, when several polymerization processes are used simultaneously, further adding a second initiator and/or a second chain transfer agent; and continuing the reaction at the pressure of 1-100 atm, and the temperature of −20-120° C. for 1-36 h, to give the amphiphilic macromolecular emulsifier with switchable surface activity, wherein the stimuli-responsive monomers comprise tertiary amine derivatives of (meth)acrylates, tertiary amine derivatives of (meth)acrylamides, amidine derivatives of (meth)acrylates, amidine derivatives of (meth)acrylamides, guanidine derivatives of (meth)acrylates, guanidine derivatives of (meth)acrylamides, tertiary amine derivatives of styrenes, amidine derivatives of styrenes and guanidine derivatives of styrenes.

9. The method of claim 8, further comprising using of the amphiphilic macromolecular emulsifier with switchable surface in the preparation of reversibly coagulable and re-dispersible polymer latexes.

10. A method of preparing a reversibly coagulable and re-dispersible polymer latex by using an amphiphilic macromolecular emulsifier with switchable surface activity comprised of a block copolymer obtained by copolymerizing one or more stimuli-responsive monomers and one or more lipophilic monomers in the presence of an initiator via reversible addition-fragmentation chain transfer (RAFT) polymerization, wherein the obtained block copolymer includes a structure composed of a hydrophilic segment-lipophilic segment-terminal RAFT reactive group in the molecule thereof, wherein the weight ratio of the stimuli-responsive monomers to the lipophilic monomers is 0.1-10, and wherein the amphiphilic macromolecular emulsifier with switchable surface activity has a number average molecular weight of 200-500,000, the method comprising:

(1) preparing a monomer emulsion by dissolving a certain amount of the amphiphilic macromolecular emulsifier with switchable surface activity in water, then adding thereto a certain amount of polymerizable monomers one time or gradually, followed by removing oxygen through purging nitrogen, and pre-emulsifying under fully stirring, to obtain a monomer emulsion; wherein the amount of the amphiphilic macromolecular emulsifier with switchable surface activity is 0.1-5% of the total mass of the monomer emulsion, and the amount of the polymerizable monomers is 10-40% of the total mass of the monomer emulsion; and (2) polymerizing the emulsion by adding an initiator to the monomer emulsion obtained in step (1), in an amount of 0.01-5% of the total mass of the monomer emulsion, and then carrying out the polymerization at a temperature of 25-90° C. for 1-20 h, to obtain the reversibly coagulable and re-dispersible polymer latex, wherein the stimuli-responsive monomers comprise tertiary amine derivatives of (meth)acrylates, tertiary amine derivatives of (meth)acrylamides, amidine derivatives of (meth)acrylates, amidine derivatives of (meth)acrylamides, guanidine derivatives of (meth)acrylates, guanidine derivatives of (meth)acrylamides, tertiary amine derivatives of styrenes, amidine derivatives of styrenes and guanidine derivatives of styrenes.

11. The method according to claim 10, further comprising: in step (1) dissolving a certain amount of a small molecular emulsifier together with the amphiphilic macromolecular emulsifier with switchable surface activity in water, wherein the mass ratio of the small molecular emulsifier to the amphiphilic macromolecular emulsifier with switchable surface activity is 0.1-10:0.1-10.

12. The method according to claim 11, wherein the small molecular emulsifier comprises small molecular surfactants with switchable surface activity and conventional surfactants, wherein the small molecular surfactants with switchable surface activity comprise alkyl amines small molecular surfactants with switchable surface activity, alkyl amidines small molecular surfactants with switchable surface activity, and alkyl guanidines small molecular surfactants with switchable surface activity.

13. The method according to claim 12, wherein the small molecular surfactants with switchable surface activity comprise N,N-dimethyldodecylamine, N,N-dimethylhexadecylamine (N,N-dimethylacetamidino)dodecane, (N,N-dimethylacetamidino)hexadecane, (tetramethylguanidino)dodecane, and (tetramethylguanidino)hexadecane.

14. The method according to claim 10, wherein the polymerizable monomer comprises styrene, substituted styrene, vinyl esters, (meth)acrylates, C4-C5 diolefins, C2-C8 olefins, substituted C2-C8 olefins, acrylonitrile, (meth) acrylic acid, maleic anhydride, dimethyl maleic anhydride, and C1-C6 alkyl vinyl ethers.

15. The method according to claim 14, wherein the polymerizable monomer comprises styrene, α-methyl styrene, C1-C6 alkyl (meth)acrylate, vinyl acetate, vinyl chloride, chloroprene, butadiene, isoprene, acrylonitrile, maleic anhydride, (meth)acrylic acid, methyl vinyl ether, ethyl vinyl ether and polyoxyethylene (meth)acrylate.

16. The method according to claim 10, wherein the polymer latex has a weight average molecular weight of 1-1000 kD and a particle size of 20-500 nm.

17. A method of manufacturing an amphiphilic macromolecular emulsifier with switchable surface activity, which is a block copolymer, the method comprising:
copolymerizing one or more stimuli-responsive monomers and one or more lipophilic monomers in the presence of an initiator via reversible addition-fragmentation chain transfer (RAFT) polymerization;
wherein the block copolymer includes a structure composed of a hydrophilic segment-lipophilic segment-terminal RAFT reactive group in the molecule thereof;
wherein the weight ratio of the stimuli-responsive monomers to the lipophilic monomers is 0.1-10;
wherein the amphiphilic macromolecular emulsifier with switchable surface activity has a number average molecular weight of 500-200,000; and
wherein the stimuli-responsive monomers comprise tertiary amine derivatives of (meth)acrylates, tertiary amine derivatives of (meth)acrylamides, amidine derivatives of (meth)acrylates, amidine derivatives of (meth)acrylamides, guanidine derivatives of (meth)acrylates, guanidine derivatives of (meth)acrylamides, tertiary amine derivatives of styrenes, amidine derivatives of styrenes and guanidine derivatives of styrenes.

18. The method of claim 17, wherein the stimuli-responsive monomers comprise dimethylaminoethyl (meth)acrylate, diethylaminoethyl (meth)acrylate, dimethylaminopropyl (meth)acrylate, dimethylaminobutyl (meth)acrylate, diethylaminopropyl (meth)acrylate, diethylaminobutyl (meth)acrylate, N,N-dimethylacetamidinoethyl (meth)acrylate, N,N-dimethylacetamidinopropyl (meth)acrylate, N,N-dimethylacetamidinobutyl (meth)acrylate, N,N-dimethylacetamidinohexyl (meth)acrylate, (N,N-dimethylacetamidino) ethyl (meth)acrylamide, (N,N-dimethylacetamidino)propyl (meth)acrylamide, (N,N-dimethylacetamidino)butyl (meth) acrylamide, (N,N-dimethylacetamidino)hexyl (meth)acrylamide, 2-methyl-1-(4-vinylbenzyl)-1,4,5,6-tetrahydropyrimidine, and 1-(4-vinylbenzyl)-1,4,5,6-tetrahydro pyrimidine.

19. The method of claim 17, wherein the one or more lipophilic monomers comprise styrene, substituted styrene, vinyl esters, (meth)acrylates, C2-C5 olefins, substituted C2-C4 olefins, C1-C6 alkyl vinyl ethers, and acrylonitrile.

20. The method of claim 19, wherein the one or more lipophilic monomers comprise styrene, α-methyl styrene, C2-C5 olefins, (meth)acrylic acid C1-C6 alkyl esters, vinyl acetate, vinyl chloride, and acrylonitrile.

21. The method of claim 17, wherein the initiator comprises oil-soluble azo initiators or oil-soluble peroxide initiators.

22. The method of claim 17, wherein the copolymerizing is carried out in the presence of a chain transfer agent comprising dithio or trithio chain transfer agent compounds.

23. The method of claim 22, wherein the dithio or trithio chain transfer agent compounds comprise dithiophenylacetate-1-phenylethyl, dithiophenylacetate-2-cyanopropyl, cyanoisopropyl dithiobenzoate, 4-cyanopentanoic acid dithiobenzoate, 2-cyanoisopropyl dithiobenzoate, 2-(2-carboxyethyl dithiocarbonylthio)propionic acid, 4-cyano-4-(diethylthiocarbamoylthio)valeric acid, 2-methoxyethyl 2-phenyl-2-(pentylthiocarbonylthio) acetate, 3-(benzylmercapto thiocarbonyl thio)propionic acid, 2-(ethylmercapto thiocarbonyl thio)-2-methyl propionic acid, 3-((1-carboxyethylmercapto) thiocarbonyl thio)propionic acid, 2,2'-thiocarbonyl di(thioalkyl) di(2-methylpropionic acid) and 2-cyanopropan-2-yl dodecyl carbonotrithiate.

24. The amphiphilic macromolecular emulsifier with switchable surface activity according to claim 1, wherein the emulsifier has a surface activity property when treated with carbon dioxide, and
wherein the surface activity property is lost when the emulsifier is treated with nitrogen, air and/or inert gas.

* * * * *